(12) United States Patent
Tan et al.

(10) Patent No.: US 10,197,850 B2
(45) Date of Patent: Feb. 5, 2019

(54) VIRTUAL CURVED SURFACE DISPLAY PANEL AND DISPLAY DEVICE

(71) Applicant: BOE TECHNOLOGY GROUP CO., LTD., Beijing (CN)

(72) Inventors: Jifeng Tan, Beijing (CN); Wei Wang, Beijing (CN); Yafeng Yang, Beijing (CN); Jian Gao, Beijing (CN); Xiaochuan Chen, Beijing (CN); Can Zhang, Beijing (CN); Can Wang, Beijing (CN); Qian Wang, Beijing (CN); Xinli Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/572,762

(22) PCT Filed: May 17, 2017

(86) PCT No.: PCT/CN2017/084688
§ 371 (c)(1),
(2) Date: Nov. 8, 2017

(87) PCT Pub. No.: WO2017/215396
PCT Pub. Date: Dec. 21, 2017

(65) Prior Publication Data
US 2018/0239194 A1    Aug. 23, 2018

(30) Foreign Application Priority Data

Jun. 15, 2016    (CN) .......................... 2016 1 0425511

(51) Int. Cl.
*G02F 1/1335*    (2006.01)
*G09F 9/30*    (2006.01)
(Continued)

(52) U.S. Cl.
CPC ....... *G02F 1/133606* (2013.01); *G02B 27/00* (2013.01); *G02F 1/1335* (2013.01);
(Continued)

(58) Field of Classification Search
CPC ... G02F 2001/133607; G02F 1/133305; G02F 1/134309; G02F 1/29; G02F 9/30
See application file for complete search history.

(56) References Cited

U.S. PATENT DOCUMENTS

| 2014/0231763 A1* | 8/2014 | Kim | ................... H01L 27/3218 |
| | | | 257/40 |
| 2015/0138486 A1 | 5/2015 | Lee | |
| 2016/0187745 A1 | 6/2016 | Jin | |

FOREIGN PATENT DOCUMENTS

| CN | 104575322 A | 4/2015 |
| CN | 105572930 A | 5/2016 |

(Continued)

OTHER PUBLICATIONS

Search Report for International Patent Application No. PCT/CN2017/084688 dated Jul. 27, 2017.

*Primary Examiner* — Thanh-Nhah P Nguyen
(74) *Attorney, Agent, or Firm* — Calfee, Halter & Griwold LLP

(57) ABSTRACT

A virtual curved surface display panel and a display device are provided. By using the light splitting principle of the grating structure, the imaging heights of the grating structures are designed to be symmetrically distributed with respect to a vertical symmetry axis of a display surface of the flat display panel. In the grating structures on the same side of the symmetry axis, the imaging heights of the respective grating structures having the same distance from the vertical symmetry axis are the same, and the imaging heights of the respective grating structures having different distances from the vertical symmetry axis are different from each other. By
(Continued)

Error! Objects cannot be created from editing field codes.

setting the imaging heights of the grating structures, the image distances of the pixels in the flat display panel are different so that the images of the plurality of pixels constitute a curved surface.

20 Claims, 4 Drawing Sheets

(51) Int. Cl.
    *G09F 9/35*     (2006.01)
    *G02B 27/00*     (2006.01)
    *G02F 1/29*     (2006.01)

(52) U.S. Cl.
    CPC ............... *G02F 1/29* (2013.01); *G09F 9/30* (2013.01); *G09F 9/35* (2013.01); *G02F 2001/133607* (2013.01)

(56) References Cited

FOREIGN PATENT DOCUMENTS

| CN | 105589277 A | 5/2016 |
|---|---|---|
| CN | 10584908 A | 8/2016 |
| CN | 205810280 U | 12/2016 |

\* cited by examiner

Error! Objects cannot be created from editing field codes.Error! Objects cannot be created from editing field codes.

US 10,197,850 B2

VIRTUAL CURVED SURFACE DISPLAY PANEL AND DISPLAY DEVICE

RELATED APPLICATIONS

The present application is the U.S. national phase entry of the international application PCT/CN2017/084688, with an international filing date of May 17, 2017, which claims the benefit of Chinese Patent Application No. 201610425511.7, filed on Jun. 15, 2016, the entire disclosures of which are incorporated herein by reference.

TECHNICAL FIELD

The present invention relates to the field of display technology, and particularly to a virtual curved surface display panel and a display device.

BACKGROUND

Curved surface display can meet people's visual experience well. By applying curved surface display, the user can be provided with comfortable visual experience, realistic sense of immediacy, and good immersion effect.

SUMMARY

The embodiments of the present invention provide a virtual curved surface display panel and a display device.

An embodiment of the invention provides a virtual curved surface display panel. The virtual curved surface display panel comprises: a flat display panel having a plurality of pixels arranged in an array, and a grating structure array for making images of the plurality of pixels form a curved surface. The grating structure array comprises a plurality of grating structures arranged in an array. Imaging heights of the plurality of grating structures are symmetrically distributed with respect to a vertical symmetry axis of a display surface of the flat display panel. In the grating structures on the same side of the symmetry axis, the imaging heights of the respective grating structures having the same distance from the vertical symmetry axis are the same, and the imaging heights of the respective grating structures having different distances from the vertical symmetry axis are different from each other.

Optionally, in the virtual curved surface display panel provided by the embodiment of the present invention, an imaging height of each grating structure gradually increases as a distance between the grating structure and the vertical symmetry axis increases.

Optionally, in the virtual curved surface display panel provided by the embodiment of the present invention, the imaging height of each grating structure increases as a grating period increases.

Optionally, in the virtual curved surface display panel provided by the embodiment of the present invention, the sub-pixels in the flat display panel correspond to the grating structures in the grating structure array one-to-one; alternatively, the pixels in the flat display panel correspond to the grating structures in the grating structure array one-to-one.

Optionally, in the virtual curved surface display panel provided by the embodiment of the present invention, each grating structure comprises: a plurality of closely arranged grating steps with different heights.

Optionally, in the virtual curved surface display panel provided by the embodiment of the present invention, a number of the grating steps in a grating structure is 3 to 100.

Optionally, in the virtual curved surface display panel provided by the embodiment of the present invention, in a grating structure, a phase difference between grating steps corresponding to different sub-pixels is $\pi 7/6$ to $\pi 3/2$.

Optionally, in the virtual curved surface display panel provided by the embodiment of the present invention, a height range of the grating step is 0-10 μm.

Optionally, in the virtual curved surface display panel provided by the embodiment of the present invention, in a grating structure, a range of height difference between two adjacent grating steps is 10 nm-10 μm.

Optionally, in the virtual curved surface display panel provided by the embodiment of the present invention, the flat display panel is any one of a liquid crystal display panel, an electroluminescent display panel, a plasma display panel, or an electronic paper.

An embodiment of the invention further provides a display device comprising the virtual curved surface display panel provided by the above described embodiments.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE INVENTION

Figure 1:
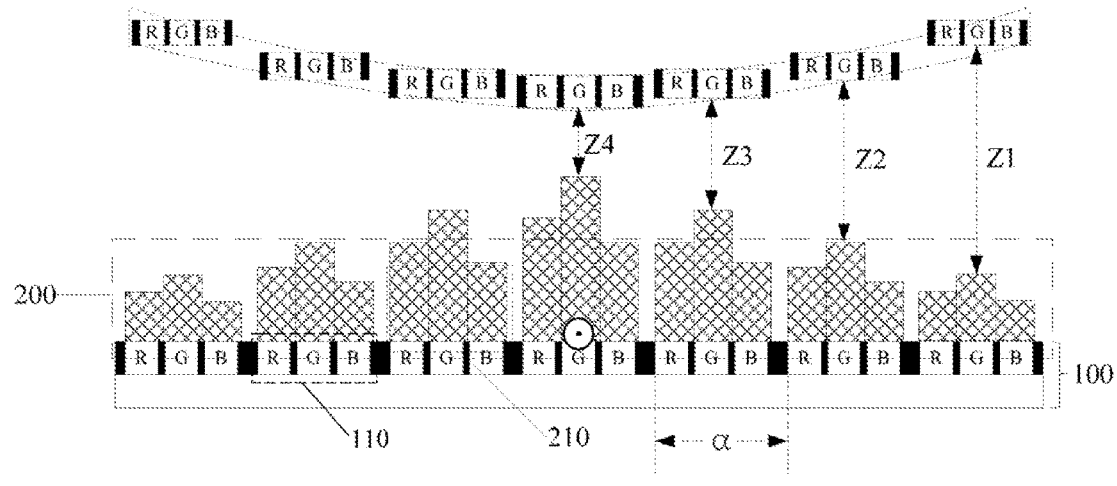
FIG. 1 is a structural schematic diagram of a virtual curved surface display panel according to an embodiment of the invention.

In the following, with reference to the accompanying drawings, the implementation of the virtual curved surface display panel and the display device provided by the embodiment of the present invention will be described in detail.

The shape and size of the components in the drawings do not reflect the true proportions of the virtual curved surface display panel, the purpose of which is merely illustrative of the present invention.

In the prior art, in order to realize curved surface display, a curved surface display panel is usually formed by performing a physical mechanical bending process to a flat display panel. However, this method for realizing curved surface display may cause problems such as light leakage and abnormal color display on the display panel due to deformation of the edge portion.

In addition, in order to achieve curved surface display, in the prior art, many modules within the display panel should be designed with flexibility. Therefore, the product yield is low, and the cost of the product is relatively high accordingly.

An embodiment of the invention provides a virtual curved surface display panel. As shown in FIG. 1, the virtual curved surface display panel comprises: a flat display panel 100 having a plurality of pixels arranged in an array, and a grating structure array 200 for making images of the plurality of pixels form a curved surface. The grating structure array 200 comprises a plurality of grating structures 210 arranged in an array. Imaging heights of the plurality of grating structures 210 are symmetrically distributed with respect to a vertical symmetry axis of a display surface of the flat display panel. In the grating structures 210 on the same side of the symmetry axis, the imaging heights of the respective grating structures 210 having the same distance from the vertical symmetry axis are the same, and the imaging heights of the respective grating structures 210 having different distances from the vertical symmetry axis are different from each other. The vertical symmetry axis refers to a symmetry axis in the vertical direction and parallel to the display surface (indicated by the sign ⊙ in FIG. 1 and perpendicular to the paper). The symmetry axis divides the display surface into two symmetrical regions. For example, in FIG. 1, the position of the grating structure 210 with the imaging height Z4 is the position of the symmetry axis. In the context of this disclosure, the imaging height means that when a beam of plane wave is incident on a periodic grating structure, an image formed by the grating structure appears at a certain distance from the grating, and this distance is referred to as the imaging height.

Figures 3, 4A:
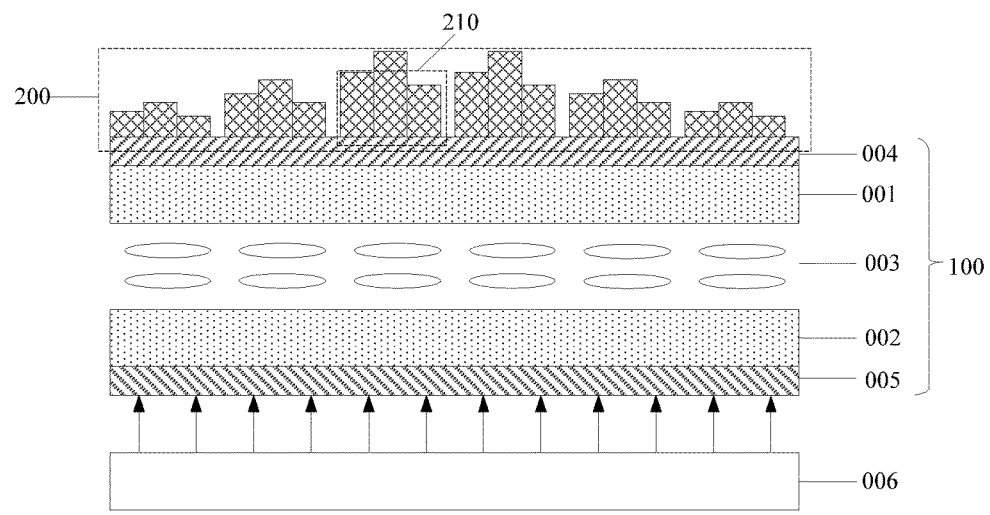
FIG. 3 is a schematic diagram of a three-step grating applied in a virtual curved surface display panel according to an embodiment of the invention.
FIGS. 4a-4d are respectively structural schematic diagrams of virtual curved surface display panels according to embodiments of the invention, in which a liquid crystal display panel is used as a flat display panel.
Figure 4B:
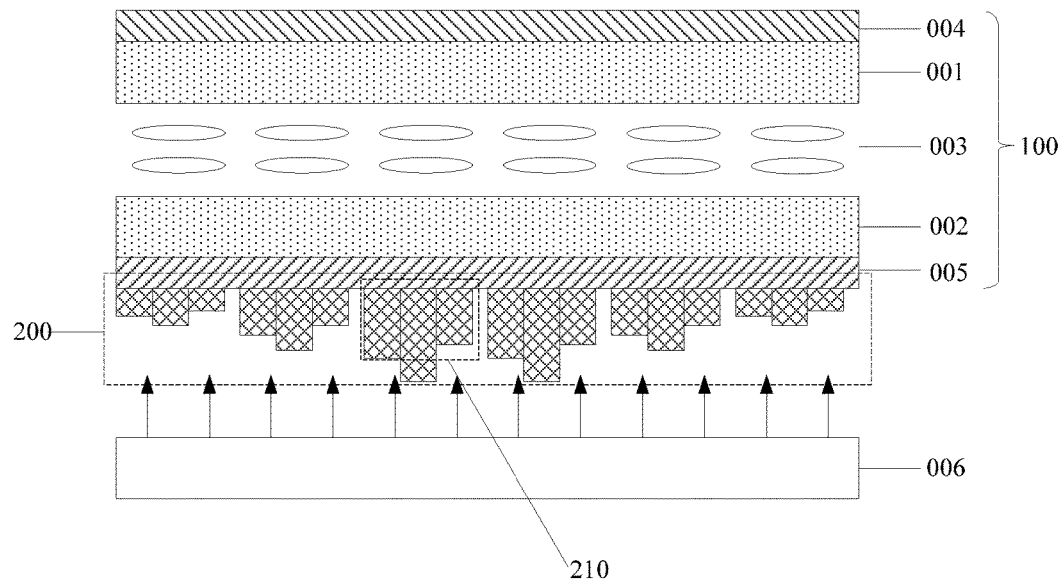
Figure 4C:
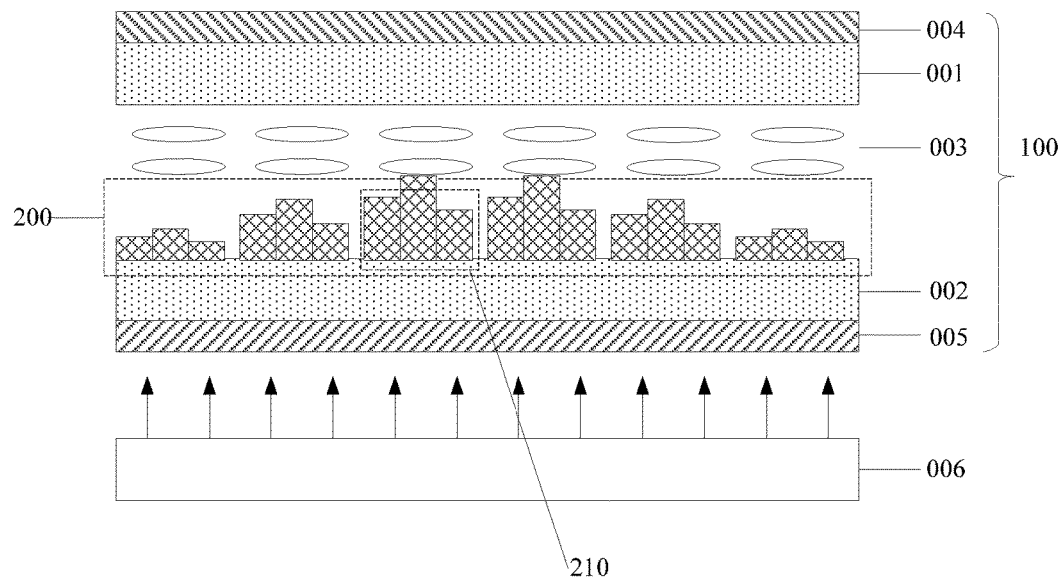
Figure 4D:
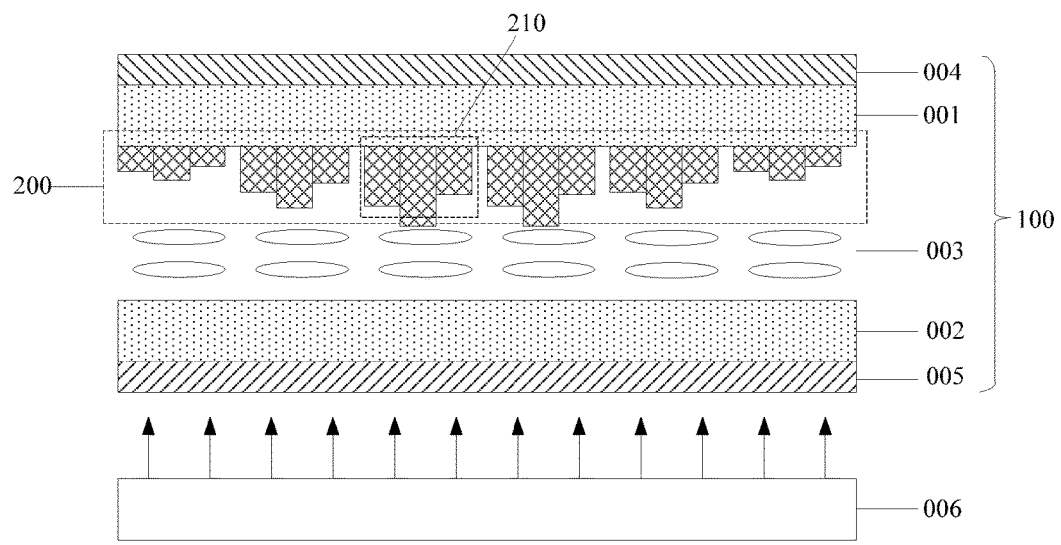
Figure 5:
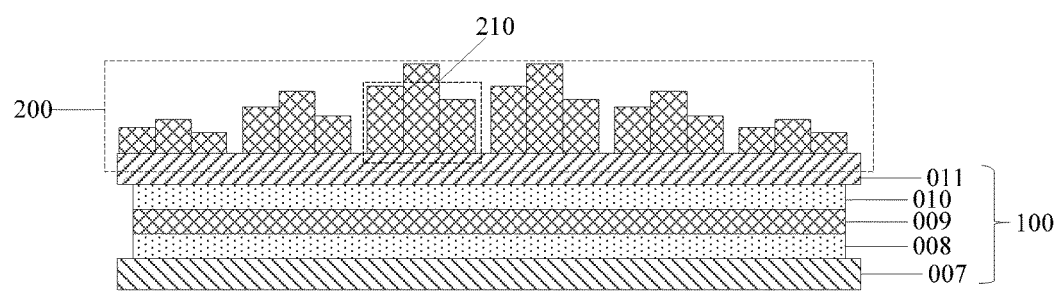
FIG. 5 is a structural schematic diagram of a virtual curved surface display panel according to an embodiment of the invention, in which an electroluminescent display panel is used as a flat display panel.

In an implementation, the arrangement position of the grating structure array 200 is not limited in the above-described virtual curved surface display panel provided by the embodiment of the present invention. Specifically, the grating structure array 200 can be provided on the outside of the flat display panel 100. For example, as shown in FIGS. 4a and 5, the grating structure array 200 can be provided on the light exit surface of the flat display panel 100, or provided between the flat display panel 100 and the backlight module 006 as shown in FIG. 4b. The grating structure array 200 can also be provided inside the flat display panel 100 as shown in FIGS. 4c and 4d, which is not limited herein. Also, the grating structure array 200 can be arranged in a forward direction with respect to the direction of light as shown in FIGS. 4a and 4c, or can be arranged in a reverse direction with respect to the direction of light as shown in FIGS. 4b and 4d, which is not limited herein.

In the virtual curved surface display panel and display device provided by the embodiments of the present invention, by using the light splitting principle of the grating structure 210 and setting the imaging heights of the grating structures 210, the image distances of the pixels in the flat display panel 100 are different so that the images of the plurality of pixels constitute a curved surface. A visual effect of virtual curved surface can thus be realized by applying a flat display panel, thereby enhancing the visual impact effect.

In an implementation, in order to achieve a desired display effect of curved surface, in the virtual curved surface display panel provided by the embodiment of the present invention, as shown in FIG. 1, an imaging height Z of each grating structure 210 gradually increases as a distance between the grating structure and the vertical symmetry axis increases. As shown in FIG. 1, the symmetry axis (indicated by the sign ⊙ and perpendicular to the paper) is located at the position of the grating structure 210 with the imaging height Z4, and Z4<Z3<Z2<Z1.

Specifically, according to the principle for the imaging height of the grating structure 210, the imaging height Z of the grating structure is related to the wavelength λ of the incident light and the grating period α.

$$Z = \frac{\lambda}{1 - \sqrt{1 - \frac{\lambda^2}{\alpha^2}}},$$

where the grating period refers to a distance between two corresponding positions in two adjacent grating structures (e.g., the left ends of two adjacent grating structures in FIG. 1). According to the above formula, when the wavelength λ of the incident light is constant, the larger the grating period α is, the higher the imaging height Z is. In the virtual curved surface display panel, the refractive indexes of the grating structure 210 and the surrounding medium are constant. For a certain wavelength, the imaging height Z of each grating structure 210 increases as the grating period α increases. Thus, the imaging heights Z of the respective grating structures 210 can be determined by setting the grating periods α of the different grating structures 210 within an allowable range of the diffraction effect of the grating structure 210.

In an implementation, the image position of each pixel can be designed specifically based on the curved surface effect to be realized (i.e., the curvature radius of the virtual curved surface). Then, the diffraction and interference effects of the grating structure can be used to design various parameters of the grating structure. The various parameters comprise: the grating period, the number of the grating steps, the minimum height difference between the grating steps, and the refractive index difference between the grating step and the surrounding medium. In this way, the imaging heights of the pixels in space are different, thereby realizing virtual curved surface display. For example, table 1 shows the decline amounts of the flat display panels with different aspect ratios and different curvature radii R. The decline amount refers to the height difference between the edge and the center of the flat display panel subjected to physical bending.

TABLE 1

| curvature radius R (mm) | decline amount H with an aspect ratio of 16:9 (mm) | decline amount H with an aspect ratio of 16:9 (mm) | decline amount H with an aspect ratio of 12:9 (mm) |
| --- | --- | --- | --- |
| 1000.00 | 233.31 | 206.67 | 170.70 |
| 2000.00 | 105.85 | 94.91 | 79.65 |
| 3000.00 | 69.50 | 62.42 | 52.50 |
| 4000.00 | 51.86 | 46.60 | 39.22 |
| 5000.00 | 41.39 | 37.20 | 31.32 |
| 6000.00 | 34.45 | 30.97 | 26.08 |

As can be seen from the above table, when the curvature radius is constant, it is possible to determine the decline amount for each pixel, thereby obtaining the imaging height Z of the grating structure corresponding to each pixel.

In an implementation, in the virtual curved surface display panel provided by the embodiment of the present invention, the sub-pixels R, G and B in the flat display panel 100 correspond to the grating structures 210 in the grating structure array 200 one-to-one. Alternatively, as shown in FIG. 1, the pixels RGB (indicated with the reference sign 110) in the flat display panel 100 correspond to the grating structures 210 in the grating structure array 200 one-to-one. The following description will be made with a grating structure 210 corresponding to a pixel RGB as an example.

In an implementation, in the virtual curved surface display panel provided by the embodiment of the present invention, as shown in FIG. 1, each grating structure 210 comprises a plurality of closely arranged grating steps with different heights.

It is to be noted that the grating steps in a grating structure 210 can have the same or different heights. In addition, the height of the grating step can be zero.

Figure 2:
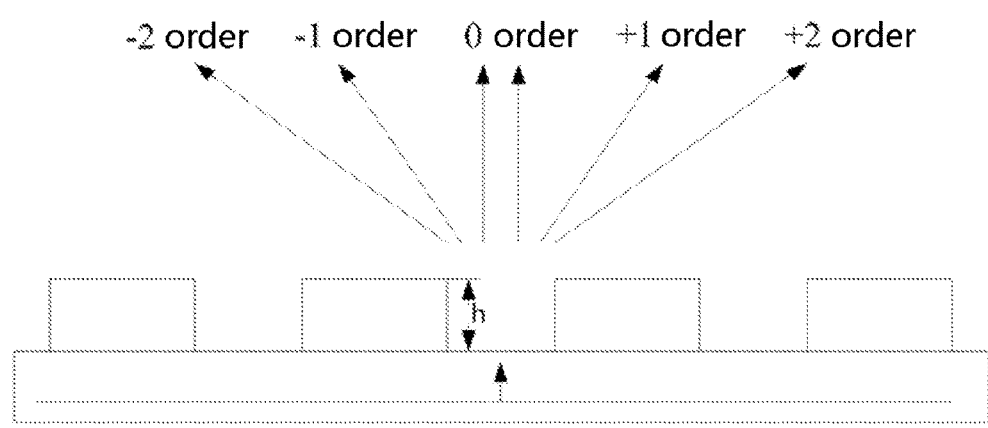
FIG. 2 is a schematic diagram showing diffraction of respective orders by a grating structure.

In particular, in the virtual curved surface display panel provided by the embodiment of the present invention, the heights of the grating steps can be adjusted, and then the adjustment for intensity of the 0 order diffraction and the first order diffraction of the grating structure can be realized by using the interference between the grating steps, as shown in FIG. 2. For example, according to the destructive interference formula: $h(n_1-n_0)=m\lambda/2$, i.e., $\lambda=2h(n_1-n_0)/m$, it can be seen that when $m=1, 3, 5 \ldots$, 0 order diffraction appears at the transmission valley, and ±1 order diffraction appears at the transmission peak. According to the constructive interference formula: $h(n_1-n_0)=m\lambda$, i.e., $\lambda=h(n_1-n_0)/m$, it can be seen that when $m=1, 2, 3 \ldots$, the 0 order diffraction appears at the transmission peak, and ±1 order diffraction appears at the transmission valley. Where h is the height of the grating step, n1 is the refractive index of the grating step, and n0 is the refractive index of the air. In the above-mentioned virtual curved surface display panel provided by the embodiment of the present invention, in general, $m=1, 3, 5 \ldots$ is used to make the 0 order diffraction appear at the transmission valley, and the ±1 order diffraction appear at the transmission peak, so as to take advantage of the most easily achievable constructive interference of ±1 order diffraction and destructive interference of 0 order diffraction, thereby achieving the purpose of light splitting.

Moreover, the diffraction and interference effects of the grating structure can be used to design the heights of the grating steps and achieve control of the diffracted light. While achieving the purpose of light splitting, it can be ensured that the monochromatic light beams emitted from the sub-pixels R, G or B in one pixel (i.e., the images of the sub-pixels) are at the same height.

In particular, the phase of a single grating step is $\varphi=2\pi(n_1-n_0)h/\lambda$. When the phase differences of the grating steps corresponding to the sub-pixels R, G and B are the same, after light splitting the sub-pixels R, G and B can be imaged at the same height. That is, when $\varphi_1-\varphi_2=\varepsilon*2\pi$, and $\varepsilon=(n_1-n_0)h/\lambda$ is constant, the sub-pixels R, G and B will be imaged at the same height. Since $\lambda=2h(n_1-n_0)/m$, when $m=1, 3, 5, \ldots$, the 0 order diffraction appears at the transmission valley, and the first order diffraction appears at the transmission peak. Therefore, when $\varepsilon=m/2$ and m is an odd number, light splitting can be achieved and the sub-pixels R, G or B are imaged at the same height.

In an implementation, in order to achieve a desired light splitting effect of the grating structure, in the virtual curved surface display panel provided by the embodiment of the present invention, simulation and optimization can be performed. Optionally, in a grating structure 210, a phase difference between grating steps corresponding to different sub-pixels is $\pi7/6$ to $\pi3/2$. Optionally, a desired light splitting effect can be achieved when $m=1/3$ and the phase difference is $\pi4/3$.

In an implementation, in the virtual curved surface display panel provided by the embodiment of the present invention, optionally, a number of the grating steps in a grating structure is 3 to 100.

In the following, a number of the grating steps being 3 (i.e., the grating structure being a three-step grating) is taken as an example. As shown in FIG. 3, a grating step corresponds to a sub-pixel R, G or B. At this time, bring a phase difference of $\pi4/3$, $n_1=n$, and $n_0=1$ into the above formula, the following formula can be obtained:

$$\begin{cases} \frac{2\pi}{\lambda_r}(n-1)(h_1-h_3) = 2m_{1,r}\pi + \frac{4\pi}{3} \\ \frac{2\pi}{\lambda_g}(n-1)(h_1-h_3) = 2m_{1,g}\pi \\ \frac{2\pi}{\lambda_b}(n-1)(h_1-h_3) = 2m_{1,b}\pi - \frac{4\pi}{3} \end{cases} \begin{cases} \frac{2\pi}{\lambda_r}(n-1)(h_2-h_3) = 2m_{2,r}\pi \\ \frac{2\pi}{\lambda_g}(n-1)(h_2-h_3) = 2m_{2,g}\pi + \frac{4\pi}{3} \\ \frac{2\pi}{\lambda_b}(n-1)(h_2-h_3) = 2m_{2,b}\pi - \frac{4\pi}{3} \end{cases}$$

Wherein $\lambda_r$, $\lambda_g$, $\lambda_b$ are wavelengths of red light, green light and blue light respectively; $h_1$, $h_2$ and $h_3$ are heights of the three steps; $m_{1,r}$ is the diffractive order of the step with the height $h_1$ with respect to red light; $m_{1,g}$ is the diffractive order of the step with the height $h_1$ with respect to green light; $m_{1,b}$ is the diffractive order of the step with the height $h_1$ with respect to blue light; $m_{2,r}$ is the diffractive order of the step with the height $h_2$ with respect to red light; $m_{2,g}$ is the diffractive order of the step with the height $h_2$ with respect to green light; $m_{2,b}$ is the diffractive order of the step with the height $h_3$ with respect to blue light. The diffractive orders of the step with the height $h_3$ with respect to red light, green light and blue light are all 0 order. If $\lambda_r=630$ nm, $\lambda_g=540$ nm, and $\lambda_b=450$ nm, it can be derived that the height differences between the three grating steps are $h_1-h_3=2.05$ μm, and $h_2-h_3=3.72$ μm. When $h_3=0$, $h_1=2.05$ and $h_2=3.72$ can be obtained.

When a grating structure contains more than three grating steps and one grating structure corresponds to one pixel, all of the grating steps can be partitioned based on the sub-pixels. A region corresponds to the red sub-pixel, a region corresponds to the blue sub-pixel, and a region corresponds to the green sub-pixel.

In an implementation, in the virtual curved surface display panel provided by the embodiment of the present invention, optionally, a height range of the grating step is 0-10 μm.

In an implementation, in the virtual curved surface display panel provided by the embodiment of the present invention, optionally, in a grating structure 210, a range of height difference between two adjacent grating steps is 10 nm-10 μm.

In an implementation, in the virtual curved surface display panel provided by the embodiment of the present invention, the flat display panel 100 can be any one of a liquid crystal display panel, an electroluminescent display panel, a plasma display panel, or an electronic paper. In FIGS. 4a-4d, a flat display panel 100 will be described by taking a liquid crystal display panel as an example. The liquid crystal display panel includes: an upper substrate 001 and a lower substrate 002 arranged oppositely, a liquid crystal layer 003 between the upper substrate 001 and the lower substrate 002, an upper polarizer 004 attached over the upper substrate 001, a lower polarizer 005 attached below the lower substrate 002, and a backlight module 006 provided below the lower polarizer 005. A side of the upper polarizer 004 departing away from the liquid crystal layer serves as a display surface (i.e., light exit surface) of the liquid crystal display panel. The grating structure array 200 can be provided over the upper polarizer 004. Light emitted from the backlight module 006 is modulated by the liquid crystal layer 003 and is emitted from the upper polarizer 004. By means of diffraction of the grating structures 210 in the grating structure array 200 having different imaging heights, the light is imaged. In FIG. 5, a flat display panel 100 will be described by taking an electroluminescent display panel as an example. The electroluminescent display panel includes: an anode 008 provided on a back plate 007, a light emitting layer 009, a cathode electrode 010, and a cover plate 011. For simplicity, the pixels are not shown in FIGS. 4a-4d and 5. Those skilled in the art will appreciate that, similar to the embodiment shown in FIG. 1, in the flat display panels 100 shown in FIGS. 4a-4d and FIG. 5, the plurality of pixels can be arranged to correspond to a plurality of grating structures 210 one-to-one.

Based on the same inventive concept, an embodiment of the present invention also provides a display device including the above mentioned virtual curved surface display panel. The display device can be any product or component with display function, such as mobile phone, tablet computer, TV, display, notebook computer, digital photo frame, navigator and so on. The implementation of the display device can refer to the embodiments of the above mentioned virtual curved surface display panel, which will not be repeated herein.

In the virtual curved surface display panel and display device provided by the embodiments of the present invention, by using the light splitting principle of the grating structure, the imaging heights of the grating structures are designed to be symmetrically distributed with respect to a vertical symmetry axis of a display surface of the flat display panel. In the grating structures on the same side of the symmetry axis, the imaging heights of the respective grating structures having the same distance from the vertical symmetry axis are the same, and the imaging heights of the respective grating structures having different distances from the vertical symmetry axis are different from each other. By setting the imaging heights of the grating structures, the image distances of the pixels in the flat display panel are different so that the images of the plurality of pixels constitute a curved surface. A visual effect of virtual curved surface can thus be realized by applying a flat display panel, thereby enhancing the visual impact effect.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A virtual curved surface display panel, comprising: a flat display panel having a plurality of pixels arranged in an array, and a grating structure array for making images of the plurality of pixels form a curved surface;
    wherein the grating structure array comprises a plurality of grating structures arranged in an array; imaging heights of the plurality of grating structures are symmetrically distributed with respect to a vertical symmetry axis of a display surface of the flat display panel; in the grating structures on the same side of the symmetry axis, the imaging heights of the respective grating structures having the same distance from the vertical symmetry axis are the same, and the imaging heights of the respective grating structures having different distances from the vertical symmetry axis are different from each other.

2. The virtual curved surface display panel according to claim 1, wherein an imaging height of each grating structure gradually increases as a distance between the grating structure and the vertical symmetry axis increases.

3. The virtual curved surface display panel according to claim 2, wherein the imaging height of each grating structure increases as a grating period increases.

4. The virtual curved surface display panel according to claim 3, wherein sub-pixels in the flat display panel correspond to the grating structures in the grating structure array one-to-one.

5. The virtual curved surface display panel according to claim 3, wherein each grating structure comprises: a plurality of closely arranged grating steps with different heights.

6. The virtual curved surface display panel according to claim 5, wherein a number of the grating steps in a grating structure is 3 to 100.

7. The virtual curved surface display panel according to claim 5, wherein in a grating structure, a phase difference between grating steps corresponding to different sub-pixels is $\pi 7/6$ to $\pi 3/2$.

8. The virtual curved surface display panel according to claim 7, wherein a height range of the grating step is 0-10 μm.

9. The virtual curved surface display panel according to claim 8, wherein in a grating structure, a range of height difference between two adjacent grating steps is 10 nm-10 μm.

10. The virtual curved surface display panel according to claim 3, wherein the pixels in the flat display panel correspond to the grating structures in the grating structure array one-to-one.

11. The virtual curved surface display panel according to 1, wherein the flat display panel is any one of a liquid crystal display panel, an electroluminescent display panel, a plasma display panel, or an electronic paper.

12. A display device comprising a virtual curved surface display panel; wherein the virtual curved surface display panel comprises: a flat display panel having a plurality of pixels arranged in an array, and a grating structure array for making images of the plurality of pixels form a curved surface;
    wherein the grating structure array comprises a plurality of grating structures arranged in an array; imaging heights of the plurality of grating structures are symmetrically distributed with respect to a vertical symmetry axis of a display surface of the flat display panel; in the grating structures on the same side of the symmetry axis, the imaging heights of the respective grating structures having the same distance from the vertical symmetry axis are the same, and the imaging heights of the respective grating structures having different distances from the vertical symmetry axis are different from each other.

13. The display device according to claim 12, wherein an imaging height of each grating structure gradually increases as a distance between the grating structure and the vertical symmetry axis increases.

14. The display device according to claim 13, wherein the imaging height of each grating structure increases as a grating period increases.

15. The display device according to claim 14, wherein sub-pixels in the flat display panel correspond to the grating structures in the grating structure array one-to-one; alternatively, the pixels in the flat display panel correspond to the grating structures in the grating structure array one-to-one.

16. The display device according to claim 14, wherein each grating structure comprises: a plurality of closely arranged grating steps with different heights.

17. The display device according to claim 16, wherein a number of the grating steps in a grating structure is 3 to 100.

18. The display device according to claim 16, wherein in a grating structure, a phase difference between grating steps corresponding to different sub-pixels is $\pi 7/6$ to $\pi 3/2$.

19. The display device according to claim 18, wherein a height range of the grating step is 0-10 μm.

20. The display device according to claim 19, wherein in a grating structure, a range of height difference between two adjacent grating steps is 10 nm-10 μm.

* * * * *